United States Patent
Ito et al.

(10) Patent No.: US 10,253,198 B2
(45) Date of Patent: Apr. 9, 2019

(54) SOLVENT-BASED INK JET INK COMPOSITION ACCOMMODATING BODY

(71) Applicant: Seiko Epson Corporation, Tokyo (JP)

(72) Inventors: Jun Ito, Shimosuwa (JP); Kenichiro Kubota, Matsumoto (JP); Naoki Koike, Matsumoto (JP); Shugo Hattori, Shiojiri (JP)

(73) Assignee: Seiko Epson Corporation (JP)

( * ) Notice: Subject to any disclaimer, the term of this patent is extended or adjusted under 35 U.S.C. 154(b) by 269 days.

(21) Appl. No.: 15/245,516

(22) Filed: Aug. 24, 2016

(65) Prior Publication Data

US 2017/0073534 A1 Mar. 16, 2017

(30) Foreign Application Priority Data

Sep. 16, 2015 (JP) .................................. 2015-182687

(51) Int. Cl.
| | |
|---|---|
| *C09D 11/36* | (2014.01) |
| *C09D 11/322* | (2014.01) |
| *C09D 11/324* | (2014.01) |
| *B41J 2/00* | (2006.01) |

(52) U.S. Cl.
CPC ................. *C09D 11/36* (2013.01); *B41J 2/00* (2013.01); *C09D 11/322* (2013.01); *C09D 11/324* (2013.01)

(58) Field of Classification Search
CPC ..... C09D 11/36; C09D 11/322; C09D 11/324; B41J 2/00; B41J 2/175; B41J 2/17503; B41J 2/17513; B41J 2002/17516

USPC ....................................................... 106/31.86
See application file for complete search history.

(56) References Cited

U.S. PATENT DOCUMENTS

| | | | | |
|---|---|---|---|---|
| 8,985,754 | B2 * | 3/2015 | Nariai | B41J 2/2107 106/403 |
| 8,991,996 | B2 * | 3/2015 | Nagase | C09D 11/36 106/31.6 |
| 9,050,816 | B2 * | 6/2015 | Koike | B41J 2/17513 |
| 9,067,423 | B2 * | 6/2015 | Denda | B41J 2/17513 |

(Continued)

FOREIGN PATENT DOCUMENTS

JP 2007-131330 A 5/2007

*Primary Examiner* — Helene Klemanski
(74) *Attorney, Agent, or Firm* — Harness, Dickey & Pierce, P.L.C.

(57) ABSTRACT

A solvent-based ink jet ink composition accommodating body includes a solvent-based ink jet ink composition which includes a solvent that is a compound represented by a general formula (1) below, and for which a moisture absorption rate is 2 (mass %·24 hours) or more at 40° C. and a relative humidity of 100% RH; and a container in which the solvent-based ink jet ink composition is accommodated, in which the container is either of at least a container formed of a member having an inorganic oxide layer or a package which accommodates the container in which the solvent-based ink jet ink composition is accommodated and is formed of a member having an inorganic oxide layer:

$$R^1O\text{—}(R^2O)_m\text{—}R^3 \tag{1}$$

wherein in the general formula (1), $R^1$ and $R^3$ each independently represent hydrogen or an alkyl group having 1 to 5 carbon atoms; $R^2$ represents an alkylene group having 2 to 4 carbon atoms; and m represents an integer of 1 to 6.)

15 Claims, 1 Drawing Sheet

(56) References Cited

U.S. PATENT DOCUMENTS

| | | | |
|---|---|---|---|
| 9,102,842 B2* | 8/2015 | Shinoda | B41J 2/17556 |
| 9,238,744 B2* | 1/2016 | Kubota | C09D 11/36 |
| 9,534,129 B2* | 1/2017 | Koike | C09D 11/36 |
| 9,758,685 B2* | 9/2017 | Ito | C09D 11/36 |
| 9,758,686 B2* | 9/2017 | Nagase | C09D 11/322 |
| 9,884,975 B2* | 2/2018 | Ito | B41J 2/17503 |
| 9,963,606 B2* | 5/2018 | Koike | C09D 11/322 |
| 2004/0183874 A1* | 9/2004 | Toyoda | B41J 2/17513 347/86 |
| 2007/0109362 A1* | 5/2007 | Hori | B41J 2/17513 347/65 |
| 2007/0229612 A1* | 10/2007 | Oyanagi | B41J 2/17513 347/85 |
| 2011/0009537 A1* | 1/2011 | Kotera | C09D 11/36 524/106 |
| 2013/0321520 A1* | 12/2013 | Ito | B41J 2/17503 347/20 |
| 2014/0132682 A1* | 5/2014 | Kida | C09D 11/322 347/100 |
| 2014/0168326 A1* | 6/2014 | Nariai | C09D 11/32 347/86 |
| 2014/0333696 A1* | 11/2014 | Nagase | C09D 11/36 347/20 |
| 2015/0049147 A1* | 2/2015 | Nakano | B41J 2/17513 347/87 |
| 2015/0247046 A1* | 9/2015 | Numakura | C09D 11/322 106/31.78 |
| 2017/0058138 A1* | 3/2017 | Kida | C09D 11/36 |

* cited by examiner

SOLVENT-BASED INK JET INK COMPOSITION ACCOMMODATING BODY

BACKGROUND

1. Technical Field

The present invention relates to a solvent-based ink jet ink composition accommodating body.

2. Related Art

The development of ink jet recording methods is proceeding in the field of sign printing. Accommodating bodies which store ink compositions are also the subject of various investigations. For example, JP-A-2007-131330 discloses a storage container and a storage method which suppress a curing reaction of a radical polymerizable compounds during storage of an ink composition, suppress an increase in the viscosity, and which do not impede the curing reaction during use of the ink composition, and discloses a storage container for a photocurable ink composition which is a storage container that accommodates a photocurable ink composition which does not contain an isolated thermal polymerization-inhibitor and in which solids which include a substance which suppresses the curing reaction of radical polymerizable compounds are arranged in the interior thereof.

However, ink jet compositions of the related art frequently use aqueous solvents, and when a solvent-based ink jet ink composition with high moisture absorption such as used in the field of sign printing is stored in an accommodating body of the related art, the water tends to easily infiltrate into the ink composition through the accommodating body. When the moisture content in the ink composition rise higher due to moisture absorption of the ink composition, there is concern of that components derived from the coloring material or the like aggregating due to a lowering of the dispersion stability or the like, thereby becoming a source of the generation of foreign materials.

Meanwhile, although forming a metal deposition layer on the surface of the accommodating body in order to suppress moisture absorption is considered, in this case, problems arise such as the visibility of the contents of the accommodating body being lowered, and it being difficult to specify the generation of foreign materials or the like, and cracks easily entering in the metal deposition layer on the accommodating body surface by an impact when dropped, and moisture being transmitted from the cracks.

SUMMARY

An advantage of some aspects of the invention is to provide a solvent-based ink jet ink composition accommodating body with long term storage stability and which suppresses moisture absorption of the solvent-based ink jet ink composition and the generation of foreign materials due to aggregation of the coloring material or the like.

The invention can be realized in the following aspects or application examples.

APPLICATION EXAMPLE 1

According to this application example, there is provided a solvent-based ink jet ink composition accommodating body, including a solvent-based ink jet ink composition which includes a solvent that is a compound represented by a general formula (1) below, and for which a moisture absorption rate is 2 (mass %·24 hours) or more at 40° C. and a relative humidity of 100% RH; and a container in which the solvent-based ink jet ink composition is accommodated, in which the container is either of at least a container formed of a member having an inorganic oxide layer or a package which accommodates the container in which the solvent-based ink jet ink composition is accommodated and is formed of a member having an inorganic oxide layer.

(In general formula (1), $R^1$ and $R^3$ each independently represent hydrogen or an alkyl group having 1 to 5 carbon atoms. Herein, either of at least $R^1$ or $R^3$ is an alkyl group having 1 to 5 carbon atoms. $R^2$ represents an alkylene group having 2 to 4 carbon atoms. m represents an integer of 1 to 6.)

According to Application Example 1, the inorganic oxide layer suppresses the transmission of the moisture by the container in which the solvent-based ink jet ink composition with high moisture absorption is accommodated being formed of a member having an inorganic oxide layer. Therefore, a solvent-based ink jet ink composition accommodating body can be provided which has long term storage stability and which suppresses moisture absorption of the solvent-based ink jet ink composition and the generation of foreign materials due to aggregation of the coloring material or the like. Through the inorganic oxide layer of the container being transparent and also being robust to impact, the visibility of the contents is ensured and the entrance of cracks into the deposition layer on the surface of the accommodating body by an impact during dropping is suppressed.

APPLICATION EXAMPLE 2

In this application example, the inorganic oxide layer may include oxides formed of at least any of silica, alumina, titania, zirconia, and ceria.

APPLICATION EXAMPLE 3

In this application example, the moisture absorption speed of the solvent-based ink jet ink composition at 40° C. and a relative humidity of 100% RH may be 2 (mass %·24 hours) to 5 (mass %·24 hours).

APPLICATION EXAMPLE 4

In this application example, the solvent-based ink jet ink composition may include at least an alkylene glycol monoether compound as a solvent.

APPLICATION EXAMPLE 5

In this application example, at least a compound having a flash point of 75° C. or more may be contained as the alkylene glycol monoether.

APPLICATION EXAMPLE 6

In this application example, the solvent-based ink jet ink composition may include a fixing resin.

APPLICATION EXAMPLE 7

In this application example, a member having an inorganic oxide layer may have a moisture permeability of 20 (g/m²·24 hours) or less.

APPLICATION EXAMPLE 8

In this application example, the solvent-based ink jet ink composition may contain at least a compound with a flash point of 70° C. or less as the solvent which is a compound represented by general formula (1).

APPLICATION EXAMPLE 9

In this application example, the material having an inorganic oxide layer may have visible light transmissivity.

APPLICATION EXAMPLE 10

In this application example, the solvent-based ink jet ink composition may include a coloring material.

BRIEF DESCRIPTION OF THE DRAWING

The invention will be described with reference to the accompanying drawings, wherein like numbers reference like elements.

DESCRIPTION OF EXEMPLARY EMBODIMENTS

Figure 1:
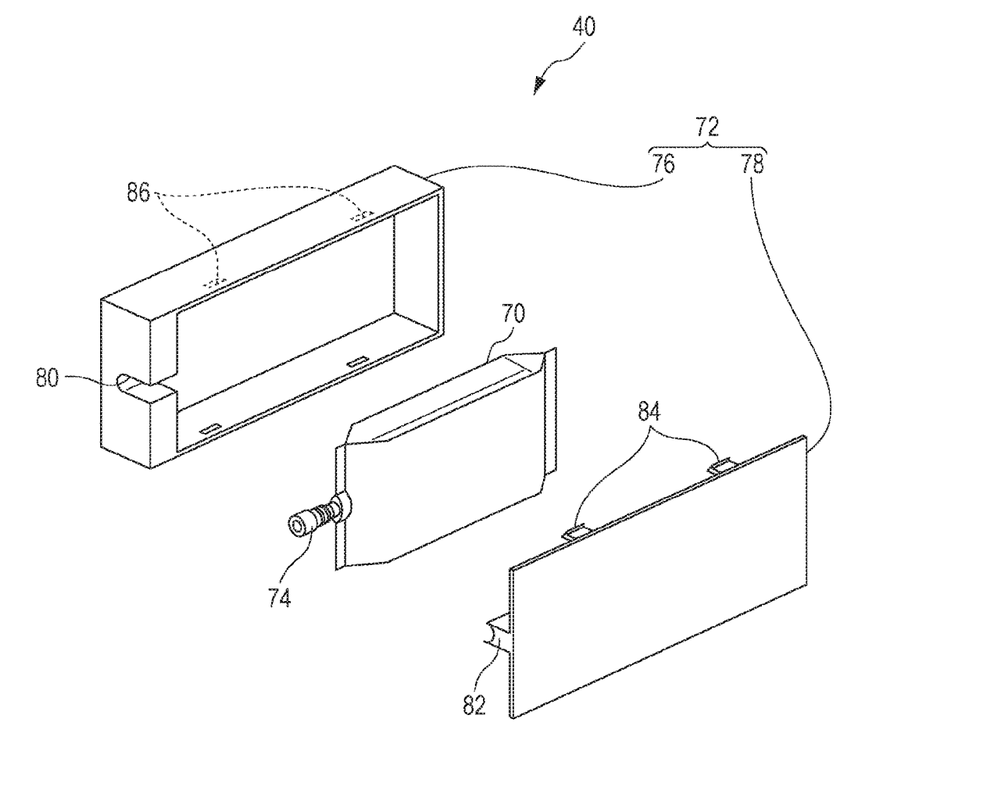
The FIGURE is an exploded perspective view illustrating an example of a solvent-based ink jet ink composition accommodating body according to an embodiment.

Hereinafter, favorable embodiments of the invention will be described in detail. The invention is not limited by the following embodiments and includes various modifications carried out in a range not departing from the gist of the invention. It should be noted that, in the drawings, like elements are given like references, and overlapping explanation thereof will not be provided. Unless otherwise noted, the position relationship, such as up, down, left, and right, are based on the positional relationships shown in the drawings. Furthermore, the dimensions and ratios in the drawings are not limited to the ratios in the drawings.

A solvent-based ink jet ink composition accommodating body (below, also referred to as "accommodating body") includes a solvent-based ink jet ink composition which includes a solvent that is a compound represented by general formula (1) below, and for which a moisture absorption rate is 2 (mass %·24 hours) or more at 40° C. and a relative humidity of 100% RH; and a container in which the solvent-based ink jet ink composition is accommodated, in which the container is either of at least a container formed of a member having an inorganic oxide layer or a package which accommodates the container in which the solvent-based ink jet ink composition is accommodated and is formed of a member having an inorganic oxide layer.

$$R^1O-(R^2O)_m-R^3 \quad (1)$$

(In general formula (1), $R^1$ and $R^3$ each independently represent hydrogen or an alkyl group having 1 to 5 carbon atoms. Herein, either of at least $R^1$ or $R^3$ is an alkyl group having 1 to 5 carbon atoms. $R^2$ represents an alkylene group having 2 to 4 carbon atoms. m represents an integer of 1 to 6.)

Below, the solvent-based ink jet ink composition accommodating body (below, also referred to as "ink accommodating body") and each component included in the solvent-based ink jet ink composition accommodated in the accommodating body (below, also referred to as "ink composition") will be described.

The wording "solvent-based ink jet ink composition" in the invention refers to an ink which includes an organic solvent as the main solvent and does not contain water as the main solvent. It is preferable that the content of water in the ink is 3 mass % or less, 1 mass % or less is more preferable, less than 0.05 mass % is still more preferable, still more preferable is less than 0.01 mass %, still more preferable is less than 0.005, and less than 0.001 mass % is most preferable. Alternatively, the ink composition may be one not substantially containing water. The wording "not substantially containing" indicates not being intentionally contained. In cases where the solvent-based ink jet ink composition includes other components than the solvent, such as a coloring material or resin, it is possible to make the content of the organic solvent in the solvent-based ink jet ink composition the remaining amount of the remainder except for the other components, and is for example, 70 mass % or more and 80 mass % or more is further possible, and the upper limit of the content is 100 mass % or less, and 99 mass % or less is further possible.

Since the solvent-based ink jet ink composition includes an organic solvent as the main solvent, whereas there are advantages where it is possible to form an image with superior waterproofness, and the drying properties when attached to a recording medium with low absorbency is superior, there are cases where foreign materials due to the aggregation of the coloring material or the like are generated due to the absorption of moisture in the ink composition curing storage. The solvent-based ink jet ink composition accommodating body according to the embodiment is effective against such problems and suppresses the absorption of moisture by the solvent-based ink jet ink composition and the generation of foreign materials due to the aggregation of the coloring material or the like and has long term storage stability.

1.1. Solvent-Based Ink Jet Ink Composition Accommodating Body

The solvent-based ink jet ink composition accommodating body according to the embodiment is provided with a container which accommodates the solvent-based ink jet ink composition, and the container is either of at least a container formed of a member having an inorganic oxide layer or a package which accommodates the solvent-based ink jet ink composition and is formed of a member having an inorganic oxide layer.

The wording "container" in the specification refers to anything that directly accommodates the ink composition. The wording "package" refers to anything that accommodates at least the container which directly accommodates at ink composition, that is, anything that indirectly accommodates the ink composition. The package may accommodate at least the container, or may accommodate at least the entire accommodating body. The wording "accommodating body" is anything that directly or indirectly accommodates the ink composition with the concept which encompasses the container and a case or the like that protects the container which is used as necessary. The accommodating body is used in the storage and shipping of the ink composition before using of the ink composition by a recording apparatus, and provides the ink composition accommodated in the accommodating body to the recording apparatus during use. An accommodating body formed of the container alone, that is, an accommodating body in which the container serves as the accommodating body as is, may be used.

Although not limited to the following, examples of the form of the accommodating body include ink cartridges, packs, bottles, tanks, flasks, and cans. Among these, an ink cartridge, pack, bottle or tank is preferable from the viewpoints of general-purpose usage and each of controlling the moisture transmissivity and the oxygen transmissivity, described later, to a preferred value.

The FIGURE is an exploded perspective view illustrating an example of a solvent-based ink jet ink composition accommodating body according to the embodiment. The ink cartridge 40 is formed of an ink pack 70 which is filled with the ink, and a cartridge case 72 formed of a main body case 76 and a lid portion 78 which accommodate and protect the ink pack 70 in the interior thereof. The ink pack 70 is provided with an ink supply port 74. The main body case 76 is provided with a notch portion 80 and a groove portion 86, and the lid portion 78 is provided with a pressing portion 82 and a hook portion 84. The ink pack 70 in the ink cartridge 40 is contained in the main body case 76 and the lid portion 78, and, in this case, the ink pack is fixed by being interposed by the pressing portion 82 and the notch portion 80 after the ink supply port 74 is fitted to the notch portion 80. The main body case 76 and the lid portion 78 are sealed by the hook portion 84 engaging the groove portion 86. The ink pack 70 corresponds to the "container" of the embodiment, and the entire cartridge which includes the cartridge case 72 corresponds to the accommodating body. Although not shown in the drawing, there are cases where the "package" is a bag which accommodates the entire cartridge, and cases where the package is a bag accommodated in the cartridge case 72 while accommodating the ink pack 70 in the cartridge. Alternatively, the cartridge case 72 may serve as the package. The entire cartridge which also includes the package may be defined as the "accommodating body".

Although not particularly limited, examples of the usage form of the accommodating body include a form (A) such as a cartridge in which the accommodating body is mounted to the recording apparatus as a separate body to the recording apparatus, and that supplies the ink composition from the accommodating body to the recording apparatus in the state of being mounted, a form (B) such as a bottle that supplies the ink composition from the accommodating body which is a separate body to the recording apparatus to the ink tank or the like of the recording apparatus, and a form (C) in which the accommodating body is provided attached in advance as one portion of the recording apparatus. In the case of forms (A) and (C), it is possible to supply the ink composition from the mounted accommodating body or the attached accommodating body to the head of the recording head via a connector such as an ink tube, thereby performing recording. The form (B) is able to supply the ink composition from the ink tank to the head of the recording apparatus via the connector such as an ink tube after the ink composition is moved from the accommodating body to the ink tank or the like of the recording apparatus, thereby performing printing.

The container is either of at least a container formed of a member having an inorganic oxide layer or a package which accommodates the container in which the solvent-based ink jet ink composition is accommodated and is formed of a member having an inorganic oxide layer. Next, a member having the inorganic oxide layer which forms the container or the package will be described.

1.1.1. Inorganic Oxide Layer

The container or the package is formed of a member having an inorganic oxide layer. The inorganic oxide layer may be formed on the entirety or a portion of either one of the outer surface or the inner surface of the container or the package. It is preferable that the inorganic oxide layer be provided on the entire surface which encompasses the composition of the member. By including the inorganic oxide layer, the container or package of the embodiment suppresses moisture transmission, and also has superior visibility. Because the moisture transmissivity is low, it is further possible to suppress the generation of foreign bodes due to the aggregation of the coloring material derived from the ink composition absorbing moisture or the like. Since the visibility is superior, the discovery of foreign materials generated in the container or package also becomes easy. The entrance of cracks into the deposition layer on the surface of the accommodating body by impact when dropped is suppressed by the inorganic oxide layer also being robust to impact.

Although not particularly limited, it is preferable that the inorganic oxide included in the inorganic oxide layer be a metal oxide. It is preferable that the metal oxide be an oxide formed of at least any of silica, alumina, titania, zirconia, and ceria. The ink accommodating body according to the embodiment further lowers the moisture transmissivity of the container or package suppresses the absorption of moisture by the accommodated ink composition and the generation of foreign materials due to the aggregation of the coloring material or the like, and maintains long-term storage stability by including such an inorganic oxide.

The inorganic oxide included in the inorganic oxide layer may be used independently, or two or more types may be used together. The inorganic oxide layer may be a single layer or may be formed of two or more layers.

It is preferable that the thickness of the inorganic oxide layer be 10 nm to 500 nm, more preferably 10 nm to 100 nm, and still more preferably 20 nm to 80 nm. Through the thickness of the inorganic oxide layer being 10 nm or more, the moisture transmissivity of the container or package is further lowered, the moisture absorption of the accommodated ink composition and the generation of foreign materials due to the aggregation of the coloring material or the like is suppressed, and the long-term storage stability is maintained. Through the thickness of the inorganic oxide layer being 500 nm or less, the visibility and flexibility are further improved.

Although not particularly limited, examples of the method of forming the inorganic oxide layer include a method of depositing the inorganic oxide on the surface of a resin molded body or inorganic molded body which forms the container or package and a method of coating a drying a liquid composition which contains the inorganic oxide on the surface of the resin molded body or the inorganic molded body which forms the container or package. The container or package may have a layer in which the inorganic oxide layer mainly forms the container or package.

1.1.2. Other Constituent Material of Member

The container or the package is formed of a member having an inorganic oxide layer. For a configuration other than the inorganic oxide layer of the member, it is possible to use a molded body formed of a resin material (resin molded body) or a molded body formed of an inorganic material (inorganic molded body), and the configuration may have an inorganic oxide layer on the surface or in the interior thereof. Although not particularly limited, examples of the other constituent materials which form the resin molded body or the inorganic molded body include resins such as polyethylene terephthalate (PET), polypropylene, polyamide fibers, ethylene vinyl acetate resins, ethylene vinyl alcohol copolymer (EVOH), and polystyrene, or inorganic materials such as glass. The above materials may be used blended at an appropriate ratio, or a plurality of types may be used overlapped.

It is possible to form the member as a film or a member having box-like or bottle-like solid shape, and is preferably a film on the feature of light weight of the container. Among the above-described constituent materials, although not particularly limited, example of the film material with satisfactory durability in a case of use as a film include plastic films such as polyethylene terephthalate (PET), polyethylene, polypropylene, polyamide resins, ethylene vinyl acetate copolymers, ethylene vinyl alcohol copolymers, and polystyrene. Among these, a high-density, low density or linear low density polyethylene, polypropylene, polyamide resin, ethylene vinyl acetate copolymer, ethylene vinyl alcohol copolymer and polystyrene are preferable. The film may be a layered film or may be a stretched film. Examples of the inorganic molded body include glass and metals. As long as the member includes at least the inorganic oxide layer, the member may have the inorganic oxide layer as the main constituent element, and for example, may be a member formed from only the inorganic oxide layer.

The oxygen transmissivity of the member having the inorganic oxide layer of the container or package is preferably 5.0 cc·20 µm/(m²·day·atm) or less, more preferably 2.0 cc·20 µm/(m²·day·atm) or less, and still more preferably 1.0 cc·20 µm/(m²·day·atm) or less. By the oxygen transmissivity being within the above-described ranges, the dissolved oxygen amount of the ink composition during storage tends to not easily change. It is possible for oxygen transmissivity to be measured with a method determined in JIS K7126 (ISO 15105).

Because the oxygen transmissivity is improved, the container or package may include a gas barrier layer. Although not particularly limited, examples of the gas barrier layer include metal layers such as an aluminum layer, and organic layers such as an ethylene vinyl alcohol copolymer layer and a polyvinyl alcohol layer.

It is preferable that the total thickness of the member of the container or package be 50 µm or more, more preferably 70 µm or more, and still more preferably 100 µm or more. By the total thickness of the container or package being 100 µm or more, there is a tendency for the moisture content and the dissolved oxygen amount of the accommodated ink composition to not easily change and the strength of the container or package to be obtained. It is preferable that the total thickness of the container or package be 300 µm or more, more preferably 200 µm or more, and still more preferably 150 µm or more. By the total thickness of the container or package being 200 µm or lower, the flexibility is further improved.

It is preferable that the capacity of the ink composition that the container or package is able to accommodate be 100 mL to 5,000 mL, more preferably 100 mL to 4,000 mL, still more preferably 300 mL to 3,000 mL or less, and particularly preferably 500 mL to 2500 mL. By the capacity of the container or package being within the above-described ranges, there are advantageous effects after the start of usage of the container or package, such as being able to completely use the ink composition while the dissolved oxygen amount of the ink in the container or package is substantially unchanged and it being difficult for the dissolved oxygen amount in the ink composition to change during storage.

It is preferable that the container or package have visible light transmissivity. The wording "visible light" refers to light having a wavelength of 400 nm to 800 nm. It is preferable that the visible light transmittance, as the average transmissivity in the above-described wavelength ranges be 40% or more, more preferably 50% or more, and still more preferably 60% or more. By the visible light transmittance being 40% or more, the visibility is further improved. Although not particularly limited, it is preferable that the upper limit of the visible light transmittance be 100%. The visible light transmittance is reduced by the thickness of the inorganic oxide layer and the molded body formed of another material being increased, and increased by the thickness of the inorganic oxide layer and the molded body formed of another material being reduced. It is possible to measure the visible light transmittance using the method disclosed in the examples.

It is preferable that the moisture transmissivity of the container or package be 20 (g/m²·24 hours) or less, more preferably 10 (g/m²·24 hours) or less, and still more preferably 5.0 (g/m²·24 hours) or less. By the moisture transmissivity being 20 (g/m²·24 hours) or less, the container or package suppresses the generation of foreign materials due to moisture absorption of the accommodated ink composition and the aggregation of the coloring material or the like and has long-term storage stability. It is preferable that the moisture transmissivity of the container or package be 0.10 (g/m²·24 hours) or more, more preferably 0.20 (g/m²·24 hours) or more, still more preferably 1.0 (g/m²·24 hours), and still more preferably 2 (g/m²·24 hours) or more. By the moisture transmissivity being 0.10 (g/m²·24 hours) or less, the degree of freedom in the design of the member increases. The moisture transmissivity increases by thinning the member, and decreases by thickening the member. It is possible to measure the moisture transmissivity using the method disclosed in the examples.

1.2. Solvent-Based Ink Jet Ink Composition

The solvent-based ink jet ink composition in the embodiment includes a solvent that is a compound represented by the following general formula (1), and a moisture absorption rate at 40° C. and a relative humidity of 100% RH of 2 (mass %·24 hours) or more.

$$R^1-O-(R^2-O)_n-R^3 \quad (1)$$

(In general formula (1), $R^1$ and $R^3$ each independently represent hydrogen or an alkyl group having 1 to 5 carbon atoms. Here, either of at least $R^1$ or $R^3$ is an alkyl group having 1 to 5 carbon atoms. $R^2$ represents an alkylene group having 2 to 4 carbon atoms. n represents an integer of 1 to 6.)

The solvent-based ink jet ink composition in the embodiment is accommodated in the container and has a moisture absorption rate at 40° C. and a relative humidity of 100% RH of 2 (mass %·24 hours) or more, the upper limit value of the moisture absorption rate at 40° C. and a relative humidity of 100% RH is preferably 8 (mass %·24 hours) or less, more preferably 5 (mass %·24 hours) or less, still more preferably 4 (mass %·24 hours) or less, and still more preferably 3 (mass %·24 hours) or less. By the upper limit value of the moisture absorption rate of the solvent-based ink jet ink composition being in the above-described ranges, the generation of foreign materials is suppressed. Although it is possible to control the moisture absorption rate by adjusting the content of components with a high moisture absorption rate or the like, there is no limitation thereto. It is possible to measure the moisture absorption rate using the method disclosed in the examples.

1.2.1. Compound Represented by General Formula (1)

The solvent-based ink jet ink composition includes a compound represented by general formula (1) as the main solvent (first solvent), and it is possible for the "alkyl group having 1 to 5 carbon atoms" in $R^1$ and $R^3$ in the general formula (1) to be a linear of branched alkyl group, and specific examples thereof include methyl groups, ethyl groups, n-propyl groups, iso-propyl groups, n-butyl groups, sec-butyl groups, tert-butyl groups, n-pentyl group, iso-pentyl groups, and tert-pentyl groups. Examples of the "alkylene group having 2 to 4 carbon atoms" in $R^2$ include ethylene groups, n-propylene groups, isopropylene groups, and butylene groups.

The compound illustrated in the above-described general formula (1) is an alkylene glycol alkyl ether, and is superior in the feature of the drying properties or the like on a recording medium. Specific examples of the compound represented by general formula (1) shown above include glycol ethers, such as alkylene glycol monoether, and alkylene glycol diether. It is possible for the glycol ethers to be used independently, or for a mixture of two or more types to be used.

In the compound represented by general formula (1), $R^1$ and $R^3$ each independently have the alkyl group as alkylene glycol ether and only one of $R^1$ and $R^3$ have the alkyl group as alkylene glycol monoether. Among these, it is preferable that the compound represented by the general formula (1) be alkylene glycol diether for the feature of drying properties of the ink.

Examples of the alkylene glycol monoether include ethylene glycol monomethyl ether, ethylene glycol monoethyl ether, ethylene glycol mono isopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, pentaethylene glycol monomethyl ether, pentaethylene glycol monoethyl ether, pentaethylene glycol monobutyl ether, propylene glycol monomethyl ether, propylene glycol monoethyl ether, dipropylene glycol monomethyl ether, and dipropylene glycol monoethyl ether.

Examples of the alkylene glycol diether include ethylene glycol dimethyl ether, ethylene glycol diethyl ether, ethylene glycol dibutyl ether, diethylene glycol dimethyl ether, diethylene glycol diethyl ether, diethylene glycol ethyl methyl ether, diethylene glycol dibutyl ether, diethylene glycol butyl methyl ether, triethylene glycol dimethyl ether, triethylene glycol diethyl ether, triethylene glycol dibutyl ether, triethylene glycol butyl methyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether.

It is preferable that the lower limit value of the content of the solvent that is a compound represented by the general formula (1) included in the solvent-based ink jet ink composition be 10 mass % or more with respect to the total mass (100 mass %) of the solvent-based ink jet ink composition, and more preferably 20 mass %, and still more preferably 30 mass % or more. It is preferable that the upper limit is 95 mass % or less, 90 mass % or less is more preferable, 85 mass % or less is still more preferable, 80 mass % or less is still more preferable, and 75 mass % or less is particularly preferable. By the content being 20 mass % or more, the wetting and spreading properties of the liquid droplets improve, and it is possible to form a favorable image with excellent smoothness. By the content being 95 mass % or less, contamination of the image due to the generation of mist is suppressed.

From the viewpoint of drying properties of the solvent-based ink jet ink composition, the improvements in the abrasion resistance, and printing quality being improved, it is preferable that at least a compound with a flash point of 72° C. or less be contained as the solvent that is a compound represented by general formula (1), and preferable that at least a compound with a flash point of 70° C. or less be contained. The content (total amount in the case of using a plurality of types) of the compound with a flash point of 72° C. or less with respect to the total amount of the solvent-based ink jet ink composition is preferably 10 mass % to 90 mass %, more preferably 20 mass % to 80 mass %, and particularly preferably 40 mass % to 70 mass %. It is more preferable that the flash point of the solvent that is a compound represented by general formula (1) be 66° C. or less. Although the lower limit of the flash point is no limited, 50° C. or more is preferable.

1.2.2. Second Solvent

In the embodiment, it is preferable that the solvent-based ink jet ink composition include a solvent that is a compound represented by the following general formula (2) as a second solvent in addition to the solvent represented by the general formula (1) as the main solvent (first solvent).

$$R^4—O—(R^5—O)_n—R^6 \qquad (2)$$

(In general formula (2), $R^4$ and $R^6$ each independently represent hydrogen or an alkyl group having 1 to 6 carbon atoms. Herein, either of at least $R^4$ and $R^6$ is an alkyl group having 1 to 6 carbon atoms. $R^5$ represents an alkylene group having 2 to 4 carbon atoms. n represents an integer of 1 to 10.)

By including the solvent that is a compound represented by general formula (2) as the second solvent, the moisture absorption rate and the drying properties of the solvent-based ink jet ink composition according to the embodiment can be adjusted.

It is possible for the "alkyl group having 1 to 6 carbon atoms" in $R^4$ and $R^6$ to be a linear or a branched alkyl group, and although examples thereof include methyl groups, ethyl groups, n-propyl groups, iso-propyl groups, n-butyl groups, sec-butyl groups, tert-butyl groups, and pentyl groups, it is preferable that one of $R^4$ or $R^6$ be hydrogen and the other be an alkyl group having 1 to 6 carbon atoms.

In the general formula (2), examples of the "alkylene group having 2 to 4 carbon atoms" in $R^5$ include ethylene groups and n-propylene groups isopropylene groups, or butylene groups. In the general formula (2), it is preferable for n to be an integer of 3 to 6.

Specific examples of the solvent that is a compound represented by the general formula (2) include glycol ethers, such as alkylene glycol monoether and alkylene glycol diether. It is possible for the compounds to be used independently, or for a mixture of two or more types to be used.

Examples of the alkylene glycol monoether include ethylene glycol monomethyl ether, ethylene glycol monoethyl ether, ethylene glycol mono isopropyl ether, ethylene glycol monobutyl ether, ethylene glycol mono-hexyl ether, ethylene glycol mono phenyl ether, diethylene glycol monomethyl ether, diethylene glycol monoethyl ether, diethylene glycol monobutyl ether, diethylene glycol mono-hexyl ether, diethylene glycol mono benzyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, pentaethylene glycol monomethyl ether, pentaethylene glycol monoethyl ether, pentaethylene glycol monobutyl ether, propylene glycol monomethyl ether, propylene glycol monoethyl ether, dipropylene glycol monomethyl ether, and dipropylene glycol monoethyl ether.

Examples of the alkylene glycol diether include ethylene glycol dimethyl ether, ethylene glycol diethyl ether, ethylene glycol dibutyl ether, diethylene glycol dimethyl ether, diethylene glycol diethyl ether, diethylene glycol ethyl methyl ether, diethylene glycol dibutyl ether, diethylene glycol butyl methyl ether, triethylene glycol dimethyl ether, triethylene glycol diethyl ether, triethylene glycol dibutyl ether, triethylene glycol butyl methyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether.

It is preferable that the solvent that is a compound represented by general formula (2) be an alkylene glycol monoether compound. From the viewpoint of drying properties of the solvent-based ink jet ink composition, the improvements in the abrasion resistance, and printing quality being further improved, it is preferable that at least a compound with a flash point of 180° C. or less be contained as the solvent that is a compound represented by general formula (2). The content (total amount in the case of using a plurality of types) of the compound with a flash point of 180° C. or less with respect to the total amount of the solvent-based ink jet ink composition is preferably 1 mass % to 20 mass %, more preferably 3 mass % to 15 mass %, and particularly preferably 5 mass % to 10 mass %. It is more preferable that the flash point of the solvent that is a compound represented by general formula (2) be 75° C. or more, and 120° C. or higher is still more preferable.

In the compound represented by the general formula (2), $R^4$ and $R^6$ each independently have the alkyl group as alkylene glycol ether and only one of $R^1$ and $R^3$ have the alkyl group as alkylene glycol monoether.

In the embodiment, the solvent-based ink jet ink composition includes alkylene glycol monoether as the solvent that is a compound represented by general formula (2), and is preferably because the features of wet-spreading properties, mist reduction, and the like are much improved. Although the moisture absorption rate of the ink jet ink composition tends to improve in a case of including alkylene glycol monoether as the solvent, it is possible make the foreign material reduction superior by using the solvent-based ink jet ink composition accommodating body of the embodiment. The content of the alkylene glycol monoether with respect to the total amount of the solvent-based ink jet ink composition is preferably 1 mass % to 20 mass %, more preferably 3 mass % to 15 mass %, and particularly preferably 3 mass % to 10 mass %. Examples of the alkylene glycol monoether include compounds represented by above-described general formula (1) and compounds represented by above-described general formula (2).

1.2.3 Cyclic Ester

The solvent-based ink jet ink composition according to the embodiment may contain a cyclic ester (cyclic lactone) as the solvent. By the solvent-based ink jet ink composition containing a cyclic ester, it is possible for a portion of the recording surface of the recording medium (for example, a recording surface which includes a vinyl chloride resin) to be dissolved, and for the solvent-based ink jet ink composition to permeate to the interior of the recording medium. By the ink permeating to the interior of the recording medium in this way. It is possible for the abrasion resistance (color fastness to rubbing) of the image recorded on the recording medium to be improved. In other words, because the cyclic ester has a high affinity with the vinyl chloride resin, the components of the solvent-based ink jet ink composition easily infiltrate (easily bite into) the recording surface. As a result the cyclic ester having such an action, it is thought that it is possible for the solvent-based ink jet ink composition in which these are blended to form an image with superior abrasion resistance even in the severe conditions such as the environment outside of a store.

The wording cyclic ester refers to a compound having a structure in which, in one molecule having a hydroxyl group and a carboxyl group, the hydroxyl group and the carboxyl group are dehydration condensed in the molecule. The cyclic ester is a compound which generally referred to as a lactone which includes a heterocycle having two or more carbon atoms and one oxygen atom, and has a structure in which a carbonyl group is arranged adjacent to the oxygen atom which forms the heterocycle.

Possible examples of those having a simple structure among the cyclic esters include β-propiolactone, β-butyrolactone, γ-butyrolactone, γ-valerolactone, γ-caprolactone, σ-valerolactone, and ε-caprolactone. There is no particular limitation to the number of members of the heterocycle of the cyclic ester, and an arbitrary side-chain may be further bonded to the member of the heterocycle. The cyclic esters may be used independently, or a mixture of two or more types may be used.

From the viewpoint of further increasing the abrasion resistance of the image formed with the solvent-based ink jet ink composition according to the embodiment, a cyclic ester having 3 to 7 members is preferable from the cyclic esters given as examples, using a cyclic ester having five or six members is more preferable, and not having a side-chain in either case is more preferable. Specific examples of such a cyclic ester include a β-butyrolactone, a γ-butyrolactone, and γ-valerolactone. Since such a cyclic ester has a high affinity with polyvinyl chloride in particular, it is possible for an extremely remarkable effect of increasing the abrasion resistance to be obtained in a case of being attached to a recording medium containing a polyvinyl chloride.

The content (total amount in the case of using a plurality of types) with respect to the total amount of the solvent-based ink jet ink composition in a case of blending the cyclic ester is preferably 5 mass % to 50 mass %, more preferably 7 mass % to 30 mass %, and particularly preferably 10 mass % to 20 mass %.

1.2.4. Other Solvents

It is possible to use a compound such as follows as the solvent in the solvent-based ink jet ink composition according to the embodiment, in addition to the compounds represented by general formulae (1) and (2) and the cyclic ester.

Examples of such a solvent include alcohols (such as methyl alcohol, ethyl alcohol, propyl alcohol, butyl alcohol, isopropyl alcohol, fluoroalcohol), ketones (such as acetone, methyl ethyl ketone, and cyclochexanone), carboxylic acid esters (such as methyl acetate, ethyl acetate, propyl acetate, butyl acetate, propionic acid methyl, and propionic acid ethyl), ethers (such as dietyl ether, dipropyl ether, tetrahydrofuran, and dioxane), and polyalcohols (such as ethylene glycol, diethylene glycol, triethylene glycol, polyethylene glycol, polypropylene glycol, propylene glycol, butylene glycol, 1,2,6-hexane triol, thio glycol, hexylene glycol, glycerin, trimethylol ethane, and trimethylolpropane).

A (poly)alcohol may be contained as the solvent. Examples of (poly)alcohols include glycerin, propylene glycol, dipropylene glycol, 1,2-butanediol, 1,2-pentanediol, 1,2-hexanediol, 1,2-heptanediol, 3-methyl-1,3-butanediol, 2-ethyl-2-methyl-1,3-propanediol, 2-methyl-1,3-propanediol, 2-methyl-2-propyl-1,3-propanediol, 2,2-dimethyl-1,3-propanediol, and 2-methylpentane-2,4-diol.

The content in a case of the (poly)alcohol being contained in the ink composition is preferably 0.05 mass % to mass % with respect to the total mass of the ink composition, and more preferably 0.1 mass % to 20 mass %, from the viewpoint of the effect of reducing unevenness in the tint by improving the wetting and spreading properties on the recording medium and the permeability, or ensuring the storage stability and ejection reliability. By the content of the (poly)alcohols being within the above-described range, the wettability, permeability and the drying properties of the ink become favorable, and an image provided with a favorable printing density (chromagenicity) may be obtained. By the content of the (poly)alcohol being within the above-described range, it is possible to appropriately set the viscosity of the ink, and there are cases in which it is possible to reduce the occurrence of clogging of the nozzles or the like.

An amine may be blended with the solvent-based ink jet ink composition, and examples thereof include hydroxylamines such as triethanol amine, tripropanol amine, N,N-dimethyl-2-aminoethanol, and N—N-diethyl-2-aminoethanol, it is possible to use one type or a plurality of types. The total content in a case of an amine being contained is preferably 0.05 mass % to 5 mass % with respect to the total mass of the solvent-based ink jet ink composition, and more preferably 0.1 mass % to 3 mass %.

Examples of the solvent include higher fatty acid esters such as methyl laurate, hexadecanoic acid isopropyl (isopropyl palmitate), isopropyl myristate, methyl oleate, and ethyl oleate, a dibasic acid diester in which an aliphatic hydrocarbon dicarboxylic acid having 2 to 8 carbon atoms (number of carbon atoms excludes the carbon atoms of the carboxyl group) is esterized with an alkyl group having 1 to 5 carbon atoms and an alkyl amide group (such as N,N-dimethyldecane amide) in which an aliphatic hydrocarbon monocarboxylic acid having 6 to 10 carbon atoms (number of carbon atoms excludes the carboxyl group) is amided (substituents in which amide nitrogen atom are substituted are each independently a hydrogen atom and an alkyl group having 1 to 4 carbon atoms).

It is possible to add one or a plurality of additional solvents to the above examples to the solvent-based ink jet ink composition, at an appropriate blending amount.

1.2.5. Color Material

It is possible for the solvent-based ink jet ink composition used in the embodiment to include a coloring material. Because the coloring material easily becomes a cause of the generation of foreign materials due to the absorption of moisture, the invention is particularly advantageous. Although a dye may be used as the coloring material and it is possible to use a pigment such as an inorganic pigment and an organic pigment, it is preferable to use a pigment from the viewpoint of light resistance and the like. These coloring materials may be used independently or a mixture of two or more types may be used.

Examples of the organic pigment include azo pigments (such as azo lake, insoluble azo pigments, condensed azo pigments, and chelate azo pigments); polycyclic pigments (such as phthalocyanine pigments, perylene and perylene pigments, anthraquinone pigment, quinacridone pigment, dioxazine pigments, thioindigo pigments, isoindolinone pigments, and quinophthalone pigments); dye lakes (such as basic dye type lakes, and acid dye type lakes); nitro pigments, nitroso pigments, aniline black, and daylight fluorescent pigments. Examples of the inorganic pigment include carbon black, titanium dioxide, silica, and alumina.

It is possible for the content of the coloring material to be set appropriately as desired, and although not limited, the content is normally 0.1 mass % to 10 mass %, preferably 0.5 mass % to 8 mass %, and more preferably 1 mass % to 6 mass %. By the content of the coloring material being in the above-described range, the chromagenicity is superior, and an image formed with the ink composition has favorable weatherability.

In a case of using a pigment as the coloring material, a pigment dispersant may be contained, and examples thereof include polyester polymer compounds such as Hinoact KF1-M, T-6000, T-7000, T-8000, T-8350P, and T-8000E (all manufactured by Takefu Fine Chemical Co., Ltd.), Solsperse 20000, 24000, 32000, 32500, 33500, 34000, 35200, and 37500 (all manufactured by LUBRIZOL Co., Ltd.), Disperbyk-161, 162, 163, 164, 166, 180, 190, 191, 192, 2091, 2095 (all manufactured by BYK-Chemie Japan Co., Ltd.), Flowlen DOPA-17, 22, 33, and G-700 (all manufactured by Kyoeisha Chemical Co., Ltd.), Ajisper PB821, and PB711 (all manufactured by Ajinomoto Fine-Techno Co., Inc.), LP4010, LP4050, LP4055, POLYMER 400, 401, 402, 403, 450, 451, and 453 (all manufactured by EFKA Chemicals Co., Ltd.). Although it is possible to select, as appropriate, the content in a case of using a pigment dispersant according to the contained pigment, 5 parts by mass to 200 parts by mass with respect to 100 parts by mass of the content of the pigment in the solvent-based ink jet ink composition is preferable, and 30 parts by mass to 120 parts by mass is more preferable.

1.2.6. Fixing Resin

The ink jet ink composition used in the embodiment may contain a fixing resin for causing the above-described coloring material to be fixed to the recording medium.

Examples of the fixing resin include fibrous resins such as acrylic resins, styrene-acrylic resins, rosin modified resins, phenol resins, terpene resins, polyester resins, polyamide resins, epoxy resins, vinyl acetate resins, vinyl chloride resins, and cellulose acetate butyrates; and vinyl toluene-α-methyl styrene copolymer resins. Among these, at least one type of resin selected from a group consisting of an acrylic resin and a vinyl chloride resin is preferable, and a vinyl chloride resin is more preferable. By containing these fixing resins, it is possible to improve the fixability to the recording medium and to also improve the abrasion resistance.

The solid content of the fixing resin in the solvent-based ink jet ink composition used in the embodiment is preferably 0.05 mass % to 15 mass %, more preferably 0.1 mass % to 10 mass %, and particularly preferably 1 mass % to 5 mass %. When the content of the fixing resin is within the above ranges, superior fixability with respect to the recording medium is obtained.

Acrylic Resin

Examples of the acrylic resin include (meth) acrylic monomers such as poly(meth)acrylic acid, poly(meth)acrylic acid methyl, poly(meth)acrylic acid ethyl, (meth) acrylic acid-(meth) acrylic acid ester copolymer resins, styrene-(meth)acrylic copolymer resins, ethylene-(meth) acrylic acid copolymer resins, ethylene alkyl(meth)acrylate resins, and ethylene-(meth)acrylic acid ester copolymer resins, or copolymer resins of these with another monomer. It is possible to use these independently or a plurality in combination.

A commercially available acrylic resin may be used, and examples thereof include ACRYPET MF (trade name, manufactured by Mitsubishi Rayon Co., Ltd.), SUMIPEX LG (trade name, manufactured by Sumitomo Chemical Co., Ltd., acrylic resin), Paraloid B-series (trade name, Rohm and Haas Co., Ltd., acrylic resin), and PARAPET G-1000P (trade name, Kuraray Co., Ltd., acrylic resin). In the embodiment, the wording "(meth)acrylic acid" signifies both acrylic acids and methacrylic acids, and the wording "(meth)acrylate" signifies both acrylate and methacrylate.

Vinyl Chloride Resin

Examples of the vinyl chloride resin include copolymers of vinyl chloride, vinyl acetate, vinyldene chloride, acrylic acid, maleic acid, vinyl alcohols or the like with another monomer, and among these a copolymer which includes a constitutional unit derived from a vinyl chloride vinyl acetate (below, referred to as "vinyl acetate copolymer") is preferable, and more preferably a vinyl acetate copolymer with a glass-transition temperature of 60° C. to 80° C.

It is possible for the vinyl acetate copolymer to be obtained with an ordinary method, and to be obtained by a suspension polymerization method. Specifically, after the water, dispersant, and polymerization initiator are incorporated in a polymerization vessel and dehydrated, it is possible to perform suspension polymerization while the vinyl chloride and the vinyl acetate pressurized, or for the reaction to be started with a portion of the vinyl chloride and the vinyl acetate pressurized and to perform suspension polymerization while pressurizing the remaining vinyl chloride during the reaction.

The vinyl acetate copolymer preferably contains from 70 to 90 mass % of vinyl chloride units as the configuration thereof. As long as the content is in the above range, the long-term storage stability is superior because of being stably dissolved in the solvent-based ink jet ink composition. Furthermore, it is possible for the discharge stability to be superior and to obtain superior fixability with respect to the recording medium.

The vinyl acetate copolymer may include other constitutional units, as necessary, along with the vinyl chloride unit and the vinyl acetate unit, examples thereof include carboxylic acid units, vinyl alcohol units, and hydroxyalkyl acrylate units, and preferable examples include vinyl alcohol units. It is possible for these to be obtained using monomers corresponding to each of the above-described units. Specific examples of the monomer which provides the carboxylic acid unit include maleic acid, itaconic acid, maleic anhydride, itaconic anhydride, acrylic acid, and methacrylic acid. Specific examples the monomer which provides the hydroxyalkyl acrylate unit include hydroxyethel(meth)acrylate, and hydroxyethyl vinyl ether. Although the content of these monomers is not limited as long as the effects of the invention are not impaired, it is possible for copolymerization to be carried out in a range of 15 mass % or less of the total amount of the monomers.

A commercially available vinyl acetate copolymer may be used, and examples thereof include SOLBIN CN, SOLBIN CNL, SOLBIN C5R, SOLBIN TA5R, SOLBIN CL, and SOLBIN CLL (all manufactured by Nissin Chemical Industry Co., Ltd.) and Kanevinyl HM 515 (manufactured by Kaneka Corporation).

Although not particularly limited, the average degree of polymerization of these resins is preferably 150 to 1100, and more preferably 200 to 750. In a case where the average degree of polymerization of these resins is in the above-described ranges, the long-term storage stability is superior because of being stably dissolved in the ink jet ink composition used in the embodiment. Furthermore, it is possible for the discharge stability to be superior and to obtain superior fixability with respect to the recording medium. It is possible for the average degree of polymerization of the resins to be obtained compliant with the method of calculating the average degree of polymerization disclosed in "JIS K6720-2" in which the specific viscosity is measured and the average degree of polymerization calculated therefrom.

Although not particularly limited, the average degree of polymerization of the resins is preferably 10,000 to 50,000, and more preferably 12,000 to 42,000. The number average molecular weight can be calculated by measurement with GPC, and it is possible for the number average molecular weight to be obtained as a polystyrene converted relative value.

1.2.7. Surfactant

From the viewpoint of decreasing the surface tension and improving the wettability with the recording medium, a polyoxyethylene derivative which is a silicon surfactant, a fluorine surfactant, or a non-ionic surfactant may also be added to the solvent-based ink jet ink composition according to the embodiment.

It is preferable to use a polyester modified silicon or a polyether modified silicon as the silicon surfactant. Specific examples include BYK-315, 315N, 347, 348, BYK-UV3500, 3510, 3530, and 3570 (all manufactured by BYK-Chemie Japan Co., Ltd.).

It is preferable to use a fluorine modified polymer as the fluorine surfactant, and specific examples include BYK-340 (manufactured by BYK-Chemie Japan Co., Ltd.).

It is preferable to use an acetylene glycol surfactant as the as the polyoxyethylene derivative. Specific example include Surfynol 82, 104, 465, 485, and TG (all manufactured by Air Products and Chemicals Japan Inc.), Olefin STG, and E1010 (all manufactured by Nissin Chemical Industry Co., Ltd.), Nissan Nonion A-10R, and A-13R (all manufactured by NOF Corporation), Flowlen TG-740W, and D-90 (manufactured by Kyoeisha Chemical Co., Ltd.), Noigen CX-100 (manufactured by Dai-ichi Kogyo Seiyaku Co., Ltd.).

The content of the surfactant in the solvent-based ink jet ink composition used in the embodiment is preferably 0.05 mass % to 3 mass %, more preferably 0.5 mass % to 2 mass %, and particularly preferably 1 mass % to 1.5 mass %.

1.2.8. Other Components

It is possible to add a substance for imparting a predetermined function, such as a pH adjuster, chelating agents such as ethylenediamine tetraacetate (EDTA), preservatives and fungicides, and antirust agents to the solvent-based ink jet ink composition used in the embodiment, as necessary.

1.2.9. Preparation Method of Solvent-Based Ink Jet Ink Composition

The solvent-based ink jet ink composition used in the embodiment is obtained by mixing the above-mentioned components in an arbitrary order, performing filtration or the like, as necessary, and removing impurities. A method of sequentially adding materials to a container provided with a stirring apparatus such as a mechanical stirrer or a magnetic stirrer and then stirring and mixing is favorably used as the method of mixing each component. It is possible to perform centrifugal filtration, filtration using a filter, and the like, as necessary, as the filtration method.

1.2.10. Properties of Solvent-Based Ink Jet Ink Composition

From the viewpoint of the balance between the recording quality and the reliability as an ink for ink jet recording, it is preferable that the solvent-based ink jet ink composition used in the embodiment has a surface tension at 20° C. of 20 mN/m to 50 mN/m, and 25 mN/m to 40 mN/m is more preferable. It is possible for the measurement of the surface tension to be measured by verifying the surface tension when a platinum plate is wetted with ink in an environment of 20° C. by using a Full Automatic Surface Tensiometer CBVP-Z (manufactured by Kyowa Interface Science Co., Ltd.).

From a similar viewpoint, the viscosity at 20° C. of the solvent-based ink jet ink composition is preferably from 2 mPa·s to 15 mPa·s and more preferably from 2 mPa·s to 10 mPa·s. It is possible for the measurement of the viscosity to carry out by raising the Shear Rate from 10 to 1000 and reading the viscosity when the Shear Rate is at 200 in an environment of 20° C. by using a Viscoelastic Testing Machine MCR-300 (manufactured by Pysica Co., Ltd).

1.2.11. Uses and Effects

By being a solvent ink which includes a solvent that is a compound represented by general formula (1), the solvent-based ink jet ink composition according to the embodiment is particular favorable to sign uses displayed outside a store, and the like because the image is superior when recorded on a film medium such as a vinyl chloride recording medium. The vinyl chronicle recording medium is not particularly limited as long as the medium contains a vinyl chloride resin. Examples of the recording medium which contains a vinyl chloride resin include hard or soft vinyl chloride-based films and sheets.

Since the solvent-based ink jet ink composition according to the embodiment has a solvent that is a compound represented by general formula (1) as the main solvent, the moisture absorption is high, and there are cases of gas-liquid foreign materials being generated due to moisture absorption of the ink composition during storage. However, by being combined with the container according to the embodiment, the transmissivity of moisture by the inorganic oxide layer of the container is suppressed, moisture absorption of the solvent-based ink jet ink composition and the generation of foreign bodies due to aggregation of the coloring material or the like is suppressed, and the solvent-based ink jet ink composition accommodating body according to the embodiment has long-term storage stability. Through the inorganic oxide layer of the container being transparent and also begin robust to impact, the visibility of the contents of the solvent-based ink jet ink composition accommodating body is ensured and the entrance of cracks into the deposition layer on the surface of the accommodating body by an impact during dropping is suppressed.

EXAMPLES

2. Examples

Below, although specific description is given of the invention using examples and comparative examples, the invention is not limited to these examples alone. The use of "part" and "%" in the examples and comparative examples is, unless otherwise stated, based on mass.

2.1. Evaluation of Ink Composition
2.1.1. Preparation of Ink Composition

Each ink composition of ink constitutions 1 to 7 was obtained by mixing and sufficiently stirring each component so as to have the constitutions in Table 1, and filtering using a 5 μm membrane filter made from PTFE.

The main materials for the ink composition used in the Table 1 are as follows.

Pigments
  Carbon Black
Cyclic Ester
  γ-butyrolactone (trade name, manufactured by Kanto Kagaku Co., Ltd.)
  σ-valerolactone (trade name, manufactured by Kishida Chemical Co., Ltd.)

Solvent
  DEGMEE: diethylene glycol methyl ethyl ether (trade name "Hisolve EDM", manufactured by Toho Chemical Industry Co., Ltd., flash point 64° C.)
  DEGdME: diethylene glycol dimethyl ether, trade name: diethylene glycol dimethyl ether, manufactured by Tokyo Chemical Industry Co., Ltd, flash point 56° C.)
  DEGdEE: diethylene glycol diethyl ether, trade name: diethylene glycol diethyl ether, manufactured by Tokyo Chemical Industry Co., Ltd, flash point 70.8° C.)
  DEGBME: diethylene glycol butyl methyl ether (trade name "Hisolve BDM", manufactured by Toho Chemical Industry Co., Ltd., flash point 94° C.)
  TriEGdME: triethylene glycol dimethyl ether, trade name "triethylene glycol dimethyl ether", manufactured by Kishida Chemical Co., Ltd., flash point 111° C.)
  DPGmME: dipropylene glycol monomethyl ether, trade name "methylpropylene diglycol", manufactured by Nippon Nyukazai Co., Ltd., flash point 76.5° C.)
  TetraEGmBE: tetraethylene glycol monobutyl ether, trade name "Butysenol 40", manufactured by KH Neochem Co., Ltd., flash point 166° C.)
  Naphtesol 200: trade name, manufactured by JX Nippon Oil & Energy Corporation, naphthene-based hydrocarbon solvent
  isononyl isononate: trade name "Saracos 99", Nisshin OilliO Group, Ltd., ester-based solvent Dispersant
  Solsperse 37500: Trade Name, Manufactured by Lubrizol Co., Ltd., Polyesterpolyamide Resin)

Surfactant
  BKY-340 (manufactured by BYK-Chemie Japan Co., Ltd., fluorine-based surfactant)

Fixing Resin
  SOLBIN CL: trade name, manufactured by Nissin Chemical Industry Co., Ltd., vinyl chloride-vinyl acetate copolymer 2.1.2. Method of Measuring Moisture Absorption Rate of Ink Composition 40 g of the ink composition was placed in a 50 mL glass flask, and left to stand for 24 hours in a state where the mouth was open in a 40° C., 100% RH environment. Next, the moisture content (mass %) included in the ink composition both before (initial value) and after moisture absorption was measured using an automatic heat vaporization device (manufactured by Hiranuma Industrial Co., Ltd.). A value in which the moisture amount before moisture absorption is subtracted from the moisture amount after moisture absorption (increase portion) is taken as the moisture absorption rate (water absorption rate).

The constitution and moisture absorption rate of each ink composition is shown in the following Table 1.

TABLE 1

| | | Flash Point | Constitution 1 | Constitution 2 | Constitution 3 | Constitution 4 | Constitution 5 | Constitution 6 | Constitution 7 |
|---|---|---|---|---|---|---|---|---|---|
| Pigment | Carbon Black | — | 4 | 4 | 4 | 4 | 4 | 4 | 4 |
| Cyclic Ester | γ-butyrolactone | — | 15 | | 15 | 15 | 15 | 15 | 15 |

TABLE 1-continued

| | | Flash Point | Constitution 1 | Constitution 2 | Constitution 3 | Constitution 4 | Constitution 5 | Constitution 6 | Constitution 7 |
|---|---|---|---|---|---|---|---|---|---|
| Solvent | σ-valerolactone | — | | 15 | | | | | |
| | diethylene glycol methylethyl ether (DEGMEE) | 64 | 44 | 20 | | 44 | 44 | | |
| | diethylene glycol dimethyl ether (DEGdME) | 56 | 20 | | | 20 | 30 | | |
| | diethylene glycol diethyl ether (DEGdEE) | 70.8 | | | 46 | | | 50 | |
| | diethylene glycol butylmethyl ether (DEGBME) | 94 | | 44 | | | | | |
| | triethylene glycol dimethyl ether (TriEGdME) | 111 | | | 18 | | | 24 | |
| | dipropylene glycol monomethyl ether (DPGmME) | 76.5 | | 10 | | 5 | | | |
| | tetraethylene glycol monobutyl ether (TetraEGmBE) | 166 | 10 | | 10 | 5 | | | |
| | Naphtesol 200 (naphthene solvent (hydrocarbon)) | 128 | | | | | | | 35 |
| | isononyl isononate (ester based solvent) | 148 | | | | | | | 39 |
| Dispersant | Solsperse 37500 | — | 4 | 4 | 4 | 4 | 4 | 4 | 4 |
| Surfactant | BYK-340 | — | 1.5 | 1.5 | 1.5 | 1.5 | 1.5 | 1.5 | 1.5 |
| Fixing Resin | Solbin CL | — | 1.5 | 1.5 | 1.5 | 1.5 | 1.5 | 1.5 | 1.5 |
| Total | | | 100.0 | 100.0 | 100.0 | 100.0 | 100.0 | 100.0 | 100.0 |
| Moisture Absorbency Rate of Ink | (mass%/0.24 hours) (40° C. × 100% RH) | | 2.1 | 2.2 | 2.7 | 2.6 | 1.7 | 1.9 | 2.5 |

2.2. Evaluation of Container (Pack)

2.2.1. Preparation of Pack

A low density polyethylene film with a thickness of 80 μm was used as the base material. One surface of the PET film was subjected to preprocessing by reactive ion etching using a plasma processing device. At this time, a high-frequency power source was used as the electrode, and the atmosphere was an argon/oxygen mixed gas atmosphere. Then, a film is obtained in which silica is deposited with a thickness of 50 nm on the processed surface by reactive ion etching inline by a vacuum deposition device using an electron beam heating method. Thereafter, using the obtained film, the pack P1 which accommodates the ink composition is prepared.

Using a biaxially oriented polyethylene terephthalate (PET) film with a thickness of 12 μm without an inorganic oxide layer, the pack P2 which accommodates the ink composition was prepared. The pack P3 was prepared similarly to the above other than aluminum being deposited with a thickness of 50 nm. The pack P4 was prepared similarly to the above other than aluminum oxide being deposited with a thickness of 50 nm.

2.2.2. Moisture Transmissivity

The moisture transmissivity of the packs P1 to P4 was measured using a method of obtaining (gas chromatograph method) the water vapor transmission rate of a plastic film and sheet of JIS K 7129. First a low humidity chamber and a high humidity chamber were separated with a test piece. In the gas chromatograph method, the low humidity chamber was evacuated with a vacuum pump, gas controlled to a fixed relative humidity flowed to the high humidity chamber, the water vapor passing through the test piece collected a measurement pipe for a fixed time, and the collected water vapor amount measured with the gas chromatograph, thereby calculating the water vapor transmission rate.

2.2.3. Oxygen Transmissivity

The oxygen transmission rate of the packs P1 to P4 was measured using a gas transmission rate testing method (gas chromatograph method) of a plastic film and sheet of JIS K 7126. One side (low pressure side) separated by the test piece was held at a vacuum and a test gas was introduced to the other (high pressure side), the gas amount passed to the low pressure side passing through the test piece was measured by the gas chromatograph method, thereby calculating the oxygen transmission rate. The oxygen transmission rate of pack P1, P3 and P4 was 1.0 cc·20 μm/(m$^2$·day·atm) or less, and the oxygen transmission rate of the pack P2 exceeded 5.0 cc·20 μm/(m$^2$·day·atm).

2.2.4. Visibility

The average transmissivity in the visible light range of 400 to 800 nm of the films (total film including layers) in the packs P1 to P4 prepared as above was measured with a spectrophotometer (manufactured by Hitachi, Ltd., trade name U-3300 Spectrophotometer). The visibility was measured based on the obtained transmissivity. P1, P2, and P4 had a transmissivity of 70% or more and visibility was possible via the film, and, although the visibility was favorable, P3 has a transmissivity of 0%, and the visibility was poor.

The physical properties of the packs P1 to P4 prepared as above were as follows.

P1: layered film pack (moisture transmissivity: 5 g/m$^2$/24 H, oxygen transmissivity: 1.0 cc·20 μm/(m$^2$·day·atm) or less), not prone to moisture absorption, has barrier layer (silica layer), favorable visibility P2: layered film pack (moisture transmissivity: 25 g/m²/24 H, oxygen transmissivity: 5.0 cc·20 μm/(m²·day·atm) or less), prone to moisture absorption, no barrier layer, favorable visibility P3: aluminum pack (moisture transmissivity: 0.1 g/m²/24 H, oxygen transmissivity: 1.0 cc·20 μm/(m²·day·atm) or less), not prone to moisture absorption, visibility deteriorated P4: layered film pack (moisture transmissivity: 5 g/m²/24 H, oxygen transmissivity: 1.0 cc·20 μm/(m²·day·atm) or less), has barrier layer (alumina layer), favorable visibility 2.3. Evaluation of Combination of Ink Composition and Container The accommodating body in which the ink composition is sealed in the container was obtained by any of the respective ink compositions of constitutions 1 to 7 being accommodated and sealed in any of the packs P1 to P4 (Examples 1 to 5 and Comparative Examples 1 to 11). The combination of the ink composition and the container were as illustrated in Table 2. The following evaluation tests were performed for the obtained Examples 1 to 5 and Comparative Examples 1 to 11.

2.3.1. Foreign Body Evaluation

Each ink composition was sealed in the respective containers (packs P1 to P4) prepared as above, and the containers were held for five days at a temperature of 60° C. and a relative humidity of 90%. The ink compositions were filtered with a filter paper after storage, and the presence or absence of residue appearing as foreign materials was verified. The evaluation criteria are as follows.

A: generation of foreign materials was identified.
B: slight generation of foreign materials was identified.
C: large amounts of foreign material generation were identified.

2.3.2. Evaluation of Wetting and Spreading (Line Width)

Each ink jet ink composition after foreign material evaluation was loaded in the head of a large-scale ink jet printer "SC-S30650" (trade name) manufactured by Seiko Epson Corp. installed in 25° C. environment, a test pattern (ruled lines and solid pattern) was printed on a polyvinyl chloride sheet base material with a preprocessed surface, and evaluation was performed by viewing with a loupe or the like. The evaluation criteria are as follows.

A: sufficient line width was obtained and the solid sites were covered by dots.
B: line width was fine; however, the solid sites were covered by dots.
C: line width was fine and the solid sites were not covered.

2.3.3. Evaluation of Mist

Each ink jet ink composition after foreign material evaluation was loaded in the head of a large-scale ink jet printer "SC-530650" (trade name) manufactured by Seiko Epson Corp. installed in 25° C. environment, a check pattern was printed on a polyvinyl chloride sheet base material with an unprocessed surface, and the mist situation on the unprinted portions were observed visually. The evaluation criteria are as follows.

A: No mist (flight of ink composition) on unprinted portions
B: Slight mist verified on unprinted portions
C: Mist clearly identified on unprinted portions, image contaminated 2.3.4. Evaluation of Pack Durability Each pack in which the ink composition is sealed was set in a case, the 30 cm×10 cm side surface of the case was oriented to be the bottom surface, and, the case was reciprocated 1000 times at a movement speed of 15 cm/s. Thereafter, the pack was removed from the case, and the external appearance of the pack was observed visually. The evaluation criteria are as follows.

A: No change to the surface of the pack
C: fine cracking identified in the surface of the pack 2.3.5. Evaluation of Abrasion Resistance Each ink jet ink composition after foreign material evaluation was loaded in the head of a large-scale ink jet printer "SC-S30650" (trade name) manufactured by Seiko Epson Corp. installed in 25° C. environment, a test pattern (solid pattern) was printed on a polyvinyl chloride sheet base material with an unprocessed surface, the printed matter was tested using an AB-301 Color Fastness Rubbing Tester (manufactured by Tester Sangyo Co., Ltd.), a rubbing block to which a white cloth for rubbing (Kanakin No. 3) is attached and the image were rubbed together in conditions of a load of 1 kg and 30 rubbing cycles, the surface state of the image was inspected visually and evaluated with the following criteria. The evaluation criteria are as follows.

A: No scratching identified in the surface
B: Slight scratching identified in the surface
C: Significant scratching identified in the surface 2.3.6. Evaluation Results The constitution of each ink composition and pack and the results of the evaluation test are illustrated in the following Table 2.

TABLE 2

| | Example 1 | Example 2 | Example 3 | Example 4 | Example 5 | Comparative Example 1 | Comparative Example 2 | Comparative Example 3 |
|---|---|---|---|---|---|---|---|---|
| Ink Constitution | Constitution 1 | Constitution 2 | Constitution 3 | Constitution 4 | Constitution 1 | Constitution 5 | Constitution 6 | Constitution 1 |
| Pack | P1 | P1 | P1 | P1 | P4 | P1 | P1 | P2 |
| Foreign Materials | A | A | A | A | A | A | A | C |
| Wetting and Spreading (line width) | B | A | A | B | B | C | C | B |
| Mist | A | A | A | A | A | B | B | B |
| Pack Durability | A | A | A | A | A | A | A | A |
| Abrasion Resistance | B | A | B | A | B | A | A | B |

| | Comparative Example 4 | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|
| Ink Constitution | Constitution 2 | Constitution 3 | Constitution 4 | Constitution 5 | Constitution 6 | Constitution 7 | Constitution 7 | Constitution 1 |
| Pack | P2 | P2 | P2 | P2 | P2 | P2 | P1 | P3 |

TABLE 2-continued

| Foreign Materials | C | C | C | B | B | C | B | A |
|---|---|---|---|---|---|---|---|---|
| Wetting and Spreading (line width) | A | A | B | C | C | A | A | B |
| Mist | B | B | B | B | B | C | C | A |
| Pack Durability | A | A | A | A | A | A | A | C |
| Abrasion Resistance | A | B | A | A | A | C | C | B |

In Examples 1 to 5 in which the ink composition which includes a solvent that is a compound represented by general formula (1) and with a moisture absorption rate 2 (mass %·24 hours) and the pack formed of a member having an inorganic oxide layer, any of the evaluations was good, and, in particular, in Examples 2 and 4 in which the ink composition with a high content of solvent with a flash point of 70° C. or lower was used, the abrasion resistance also obtained a high evaluation.

In contrast, in comparative examples 1, 2 and 7 to in which an ink composition with a moisture absorption rate of less than 2 (mass %·24 hours) or an ink composition not including a solvent which is a compound represented by general formula (1) was used, the generation of foreign materials was identified, and resulted in deterioration in the examples on the feature of wetting and spreading and the generation of mist. In particular, in the Comparative Examples 9 and 10 in which the ink composition with constitution 7 not including a solvent that is a compound represented by general formula (1) was used, the solubility of the fixing resin worsened and foreign materials were created, and resulted in the mist also increasing and the abrasion resistance worsening without creating a smooth film on the recording medium.

In the comparative examples 3 to 6, and 11 in which P2 and P3 not formed of a member having an inorganic oxide layer were used as the pack, the generation of foreign materials was identified, resulting in the durability of the pack deteriorating. Because the ink composition in which the generation of foreign materials was identified while stored in the pack was used, mist was also identified compared to the examples. In Comparative Example 3, when foreign material evaluation was carried out similarly to comparative example 3 except for the pack used (pack P2) being accommodated in a bag formed prepared with a film with the same configuration as the pack P1 and sealed with a heat press, and storage for foreign material testing was performed in this state, since the results were that the generation of foreign materials was not identified similarly to Example 1, it was determined to be effective even in a form in which the container is accommodated in the accommodating body.

As illustrated above, in a case of using the solvent-based ink jet ink composition which includes a solvent which is a compound represented by general formula (1) and which has a moisture absorption rate at 40° C. and a relative humidity of 100% RH of 2 (mass %·24 hours) or more, by providing an accommodating body in which the container in which the ink composition is accommodated is a container formed of a member having an inorganic oxide layer or formed of a member which accommodates the container in which the ink is accommodated and has an inorganic oxide layer, it is possible to suppress the generation of foreign materials while suppressing the moisture absorption, and it was determined that the invention of the present application was particularly useful.

The entire disclosure of Japanese Patent Application No.: 2015-182687, filed Sep. 16, 2015 is expressly incorporated by reference herein.

What is claimed is:

1. A solvent-based ink jet ink composition accommodating body, comprising:
    a solvent-based ink jet ink composition which includes a solvent that is a compound represented by a general formula (1) below, and for which a moisture absorption rate is 2 (mass %·24 hours) or more at 40° C. and a relative humidity of 100% RH; and
    a container in which the solvent-based ink jet ink composition is accommodated,
    wherein the container is either of at least a container formed of a member having an inorganic oxide layer having a thickness ranging from 10 nm to 500 nm or a package which accommodates the container in which the solvent-based ink jet ink composition is accommodated and is formed of a member having an inorganic oxide layer that has a thickness ranging from 10 nm to 500 nm;

$$R^1O\text{---}(R^2O)_m\text{---}R^3 \tag{1}$$

wherein in the general formula (1), $R^1$ and $R^3$ each independently represent hydrogen or an alkyl group having 1 to 5 carbon atoms; $R^2$ represents an alkylene group having 2 to 4 carbon atoms; m represents an integer of 1 to 6.

2. The solvent-based ink jet ink composition accommodating body according to claim 1,
    wherein the inorganic oxide layer includes oxides formed of at least one of silica, alumina, titania, zirconia, and ceria.

3. The solvent-based ink jet ink composition accommodating body according to claim 1,
    wherein the moisture absorption rate of the solvent-based ink jet ink composition at 40° C. and a relative humidity of 100% RH is 2 (mass %·24 hours) to 5 (mass %·24 hours).

4. The solvent-based ink jet ink composition accommodating body according to claim 1,
    wherein the compound represented by the general formula (1) is alkylene glycol monoether.

5. The solvent-based ink jet ink composition accommodating body according to claim 4,
    wherein the alkylene glycol monoether has a flash point of 75° C. or more.

6. The solvent-based ink jet ink composition accommodating body according to claim 1,
    wherein the solvent-based ink jet ink composition further includes a fixing resin.

7. The solvent-based ink jet ink composition accommodating body according to claim 1, wherein the member having an inorganic oxide layer has a moisture permeability of 20 (g/m²·24 hours) or less.

8. The solvent-based ink jet ink composition accommodating body according to claim 1, wherein the compound represented by the general formula (1) has a flash point of 70° C. or less.

9. The solvent-based ink jet ink composition accommodating body according to claim 1, wherein the member having an inorganic oxide layer has visible light transmissivity.

10. The solvent-based ink jet ink composition accommodating body according to claim 1, wherein the solvent-based ink jet ink composition further includes a coloring material.

11. The solvent-based ink jet composition accommodating body according to claim 1, wherein the container has a visible light transmissivity greater than or equal to 40%.

12. The solvent-based ink jet composition accommodating body according to claim 1, wherein the container formed of a member having an inorganic oxide layer further includes a gas barrier layer formed of at least one of an aluminum layer, an ethylene vinyl alcohol copolymer layer, or a polyvinyl alcohol layer.

13. The solvent-based ink jet composition accommodating body according to claim 1, wherein the package which accommodates the container in which the solvent-based ink jet ink composition is accommodated and is formed of a member having an inorganic oxide layer further includes a gas barrier layer formed of at least one of an aluminum layer, an ethylene vinyl alcohol copolymer layer, or a polyvinyl alcohol layer.

14. The solvent-based ink jet composition accommodating body according to claim 1, wherein the solvent-based ink jet ink composition further includes a second solvent represented by a general formula (2):

$$R^4-O-(R^5-O)_n-R^6 \qquad (2)$$

wherein in the general formula (2) $R^4$ and $R^6$ each independently represent hydrogen or an alkyl group having 1 to 6 carbon atoms; $R^5$ represents an alkylene group having 2 to 4 carbon atoms; and n represents an integer of 1 to 10.

15. The solvent-based ink jet composition accommodating body according to claim 1, wherein the inorganic oxide layer comprises two or more layers and each layer comprises at least one of silica, alumina, titania, zirconia, and ceria.

* * * * *